United States Patent
Dee et al.

(10) Patent No.: US 6,266,524 B1
(45) Date of Patent: *Jul. 24, 2001

(54) METHOD AND SYSTEM FOR CALL SCREENING

(75) Inventors: Heather C. Dee, Tinton Falls; Bruce L. Hanson, Little Silver; Kenneth M. Huber, Red Bank; Eugene J. Joseph, Shrewsbury; Steven C. Salimando, Little Silver, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/596,223

(22) Filed: Jun. 14, 2000

Related U.S. Application Data

(63) Continuation of application No. 09/167,119, filed on Oct. 6, 1998, now Pat. No. 6,115,602, which is a continuation of application No. 08/754,662, filed on Nov. 21, 1996, now Pat. No. 5,835,573.

(51) Int. Cl.[7] .................................. H04Q 7/20
(52) U.S. Cl. ................ 455/406; 455/408; 455/414; 455/415; 455/567
(58) Field of Search ........................ 455/406–407, 455/412, 414–415, 413, 408, 417, 445, 567, 458; 329/67.1, 88.08, 88.19, 201, 218, 142, 114, 127, 210–211

(56) References Cited

U.S. PATENT DOCUMENTS

| | | |
|---|---|---|
| 5,471,519 | 11/1995 | Howe et al. . |
| 5,473,671 | 12/1995 | Partridge, III . |
| 5,511,111 | 4/1996 | Serbetcioglu et al. . |
| 5,548,636 | 8/1996 | Bannister et al. . |
| 5,557,664 | 9/1996 | Burns et al. . |
| 5,579,379 | 11/1996 | D'Amico et al. . |
| 5,623,536 | 4/1997 | Solomon et al. . |
| 5,651,054 | 7/1997 | Dunn et al. . |
| 5,835,573 | 11/1998 | Dee et al. . |
| 5,960,064 | 9/1999 | Foladare et al. . |
| 6,115,602 | * 9/2000 | Dee et al. ........................ 455/406 |

FOREIGN PATENT DOCUMENTS

| | | |
|---|---|---|
| 0688 126 A2 | 12/1995 | (EP) . |
| 96/20571 | * 7/1996 | (WO) . |
| WO 96/32803A | 10/1996 | (WO) . |

OTHER PUBLICATIONS

Worrall, D.P., "1A Voice Storage System: New Custom Calling", *Bell Syst. Tech. J.* (*USA*), May–Jun. 1982, vol. 61, No. 5, pp. 821–839.

* cited by examiner

*Primary Examiner*—Nay Maung

(57) ABSTRACT

A method and system are disclosed for providing call screening in conjunction with a variety of network-based call services. An exemplary method for providing a called party at a called party station with call screening includes: (a) forwarding a call to the called party station (CPS) to a voice mailbox so that a caller can leave a message for the called party; (b) initiating a simplex call to the CPS; and (c) bridging the call forwarded to the voice mailbox and the simplex call to the CPS so that the called party can hear the caller leaving a message for the CPS; (d) initiating a duplex call to the CPS in response to signaling received from the CPS; and (e) bridging the call forwarded to the voice mailbox and the duplex call so that the caller and the called party are in communication with one another. In one embodiment of the present invention, the step of initiating a simplex call includes the step of delivering a distinctive ring to the CPS indicating that the caller is leaving a message for the CPS. In another embodiment of the present invention, the step of initiating a simplex call includes the step of transmitting a call waiting indicator to the CPS. In yet another embodiment of the invention, the step of initiating a simplex call includes the step of transmitting a signal to the CPS indicating that the calling party station will pay for cellular charges associated with the call.

7 Claims, 2 Drawing Sheets

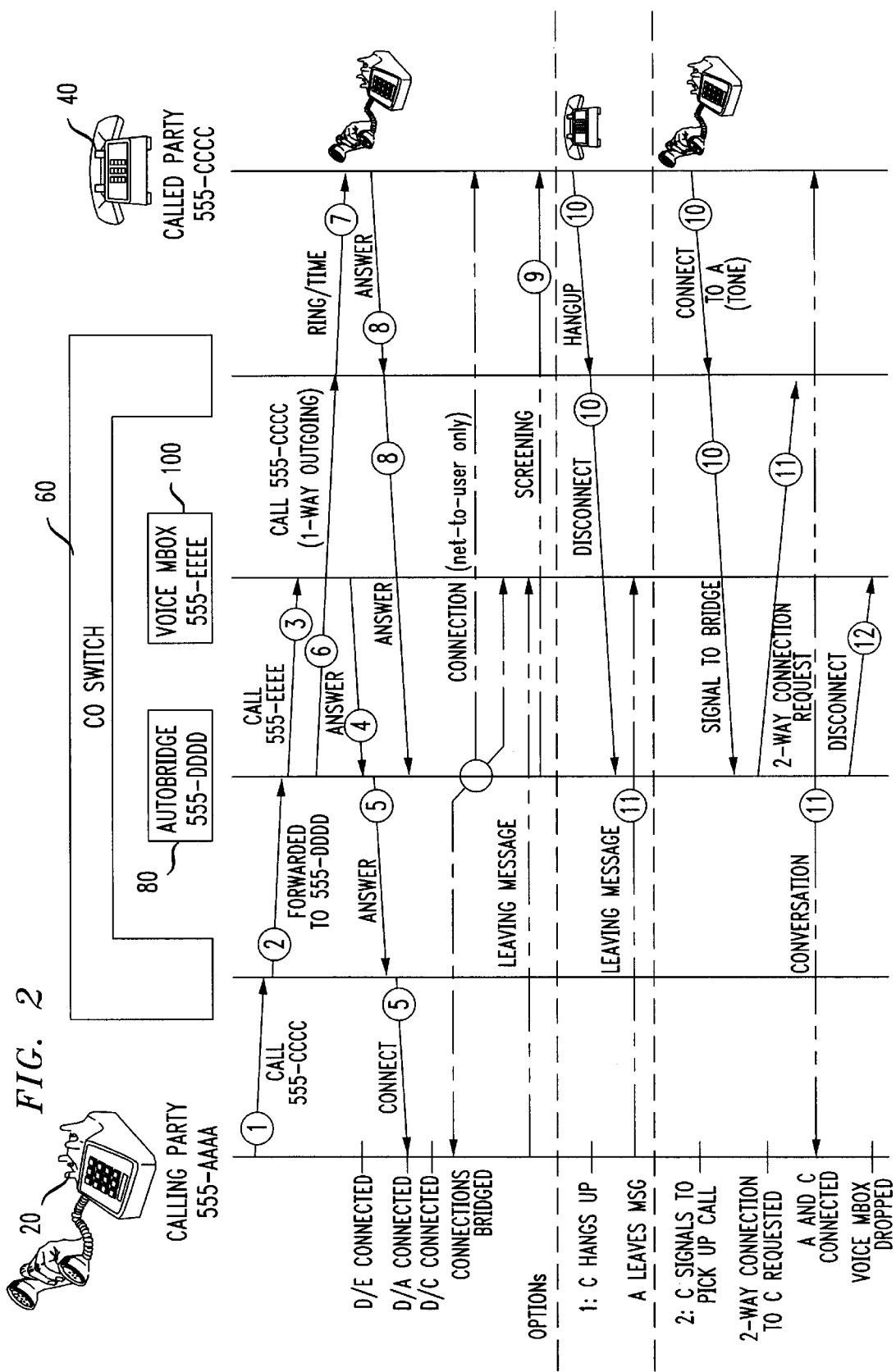

METHOD AND SYSTEM FOR CALL SCREENING

This is a continuation of application Ser. No. 09/167,119 filed Oct. 6, 1998, now U.S. Pat. No. 6,115,602 which is a continuation of application Ser. No. 08/754,662 filed Nov. 21, 1996, now U.S. Pat. No. 5,835,573.

TECHNICAL FIELD

This invention relates generally to a method and system for providing call screening capabilities in conjunction with a variety of network-based call services.

BACKGROUND

Consumers have traditionally used telephone answering machines to ensure that callers can leave a message when the called party is unable to get to the phone. Recently, consumers have also been turning to an ever increasing number of network-based services to ensure that they get all of their calls. The growing number of subscriptions to call waiting service and call answer service (CAS), both offered today by many local telephone companies, are good examples of this "I've got to get my calls" phenomena.

Call waiting is a custom calling service that uses a short tone or a "click" to let a subscriber know someone else is calling while the subscriber is on the phone. The subscriber can then put the first call "on hold" to talk to the second caller. CAS is a custom calling service that redirects all calls encountering either a ring-no-answer or busy condition to a network voice messaging platform where the caller can record a message for the called party. The called party is then provided with a message waiting indicator in the form of a stutter dial tone or a flashing light on the called party's telephone. The called party, upon detection of this indicator, can dial into the voice messaging platform to retrieve the recorded message from his/her mailbox.

One feature that neither of the foregoing network-based services offers is passive call screening. A subscriber to call waiting service does not presently have the ability to determine the identity of the second caller without actually placing the first call on hold and talking to the second caller. Moreover, consumers are faced with a dilemma when deciding whether to discontinue using a conventional telephone answering machine in favor of call answer service. Although consumers switching to call answer service gain the ability to have callers leave a message upon encountering a busy condition (conventional telephone answering machines only provide callers with this opportunity upon encountering a ring-no-answer condition), they lose all ability to screen their calls.

SUMMARY OF INVENTION

The above-identified problems are solved and a technical advance is achieved in the art by providing a method and system for call screening in conjunction with a variety of network-based call services. An exemplary method for providing a called party at a called party station with call screening includes (a) forwarding a call to the called party station to a voice mailbox so that a calling party can leave a message for the called party; (b) initiating a call to the called party station; and (c) bridging the call forwarded to the voice mailbox and the call to the called party station so that the called party can hear the calling party leaving a message for the called party station. In one embodiment of the present invention, the step of initiating a call includes the step of delivering a distinctive ring to the called party station indicating that the calling party is leaving a message for the called party station. In another embodiment of the present invention, the step of initiating a call includes the step of transmitting a call waiting indicator to the called party station. In yet another embodiment of the invention, the step of initiating a call includes the step of transmitting a signal to the called party station indicating that the calling party station has elected to pay for cellular charges associated with the call.

Other and further aspects of the present invention will become apparent during the course of the following description and by reference to the attached drawings.

BRIEF DESCRIPTION OF THE DRAWINGS

FIG. 2 depicts a call flow for the embodiment of FIG. 1.

DETAILED DESCRIPTION

Figure 1:
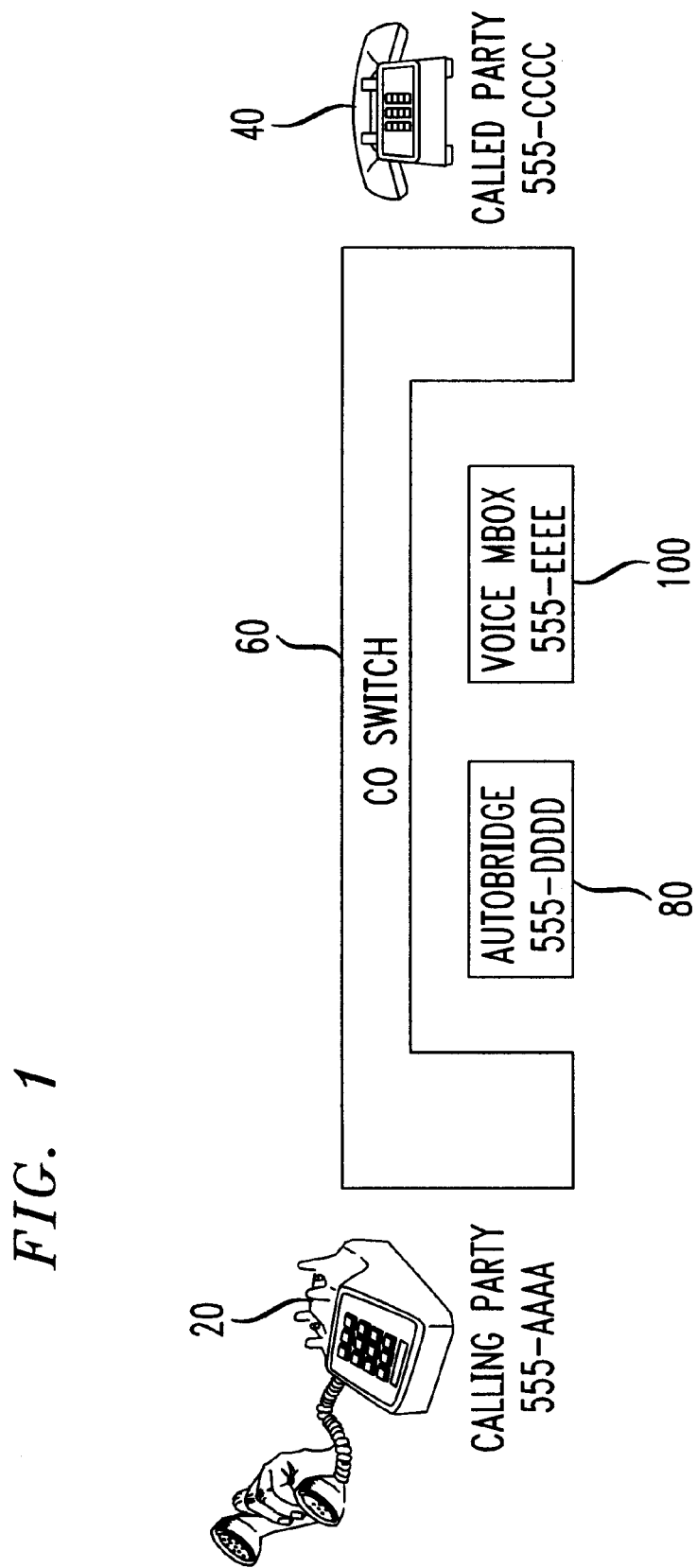
FIG. 1 is a block diagram illustrating one embodiment of the present invention.

Referring now to the drawings wherein like reference numbers refer to like parts, FIG. 1 illustrates one embodiment of the present invention. As shown in FIG. 1, a calling party 20 and a called party 40 are coupled to a network switch 60. The switch 60 may be local to both the calling and called parties (e.g., for intra-LATA or local calls), or local only to one of the parties (e.g., for calls other than local calls such as inter-LATA or long-distance calls). In the latter case, the switch 60 may thus be either an originating switch or a terminating switch. Moreover, the switch 60 may be either a central office switch or an interexchange carrier switch (e.g., an AT&T 4ESS toll tandem). The switch 60 may also be a private branch exchange (PBX). Although not intended to be limiting, the switch 60 in FIG. 1 is depicted as a central office switch local to both the calling and called parties. The switch 60, in turn, is coupled to an autobridge module 80 whose functionality (described in detail below) can be implemented in software located either internally to the switch 60 or as an adjunct thereto.

The switch 60 is also coupled to a voice mailbox 100 assigned to me called party 40. The voice mailbox 100 is typically, but not necessarily, located in a voice messaging platform remote from the switch 60. Traditionally, the called party 40 has been able to access his or her mailbox 100 to retrieve messages, administer greetings and send voice messages to other subscribers. In accordance with the present invention, the called party 40 can also access the mailbox 100 to activate call screening. To illustrate, upon accessing the mailbox, the called party may be presented with an inventory of messages followed by a main menu of available options (e.g., retrieve messages, administer greetings, send voice messages, etc.). In accordance with the present invention, one of the options available is call screening. A user is also able to set the call screening feature to automatically activate/deactivate at certain times of the day. Once the called party 40 has selected call screening (e.g., via touch-tone input), the switch 60 is appropriately informed and, all calls to the called party 40 are thereafter automatically redirected to the voice mailbox 100 irrespective of whether a ring-no-answer or busy condition is encountered. As will be described more fully below in connection with FIG. 2, the autobridge module 80 provides the called party 40 with the ability to screen such calls while the calling party 20 is leaving a message.

FIG. 2 shows a call flow for the embodiment of FIG. 1. The call flow assumes that the called party 40 has already accessed his or her mailbox 100 to activate the call screening service of the present invention. The call flow further assumes that the switch 60 has been informed of this and has changed the status of the called party's 40 line or associated number with respect to call screening accordingly (e.g., call screening "ON"). Although not intended to be limiting; the switch 60 in the call flow of FIG. 2 is local to both the calling and called parties (i.e., the call flow is for an intra-LATA or local call).

As shown in FIG. 2, a calling party 20 goes off-hook and signals the central office switch 60 to place a call to the called party 40. (Step 1). The switch 60 forwards the call to the autobridge module 80, which as previously stated, can be implemented in software located either internally to the switch 60 or as an adjunct thereto. (Step 2). The autobridge module 80 initiates a call to, and receives answer from, the called party's voice mailbox 100. (Steps 3 and 4). The switch 60 then receives answer from, and connects the calling party 20 to, the autobridge module 80. (Step 5). At this point, the calling party 20 is connected to the voice mailbox 100.

At the same time that the autobridge 80 places a call to the called party 40, the autobridge 80 also initiates a simplex or "send only" call to the called party 40. (Step 6). A "send only" call is a call during which voice signals generated by the called party 40 are muted on the call. For reasons discussed below, DTMF signals generated by the called party 40, in contrast, are not muted on a "send only" call. The switch 60 "rings" the called party's phone. (Step 7). The ring signal may be a distinctive ring that alerts the called party 40 that a caller 20 is currently leaving a message in the called party's mailbox 10. For calls waiting, the autobridge 80 will instead request the switch 60 to send a short tone or "call waiting click" to the called party 40. The called party 40 answers the call and the switch 60 connects the called party 40 to the autobridge 80. (Step 8). For call waiting, the called party 40 can answer the call by pressing and releasing the receiver button on his or her phone. The called party is thus bridged onto the call-in-progress between the caller 20 and the mailbox 100, however, as previously stated, any voice signals generated by the called party 40 are muted during the call. Ideally, the called party 40 is bridged onto the call as the caller 20 is either listening to a personal/system greeting or, as the caller is beginning to leave a message for the called party 40 in the called party's mailbox 100. In this manner, the called parry 40 can screen the call. (Step 9).

At this point, the called party 40 may decide not to talk to the calling party 20. The called party 40, having screened the caller 20 in the process of leaving a message in the called party's mailbox 100, can simply hang up, thereby disconnecting from the autobridge 80. (Option 1, Step 10). The calling party 20 can continue to leave a message for the called party 40. (Option 1, Step 11). Alternatively, the called party 40 may decide to talk to the calling party 20. Having screened the calling party 20, the called party 40 can signal the autobridge 80 via, e.g., pre-defined touch-tone signaling, to indicate a desire to talk to the calling party 20. (Option 2, Step 10). The autobridge 80 will request the switch 60 to establish a two-way connection to the called party 40, and will bridge in duplex mode (a) the call between the calling party 20 and the autobridge 80 and (b) the call between the autobridge 80 and the called party 40. (Option 2, Step 11). The autobridge 80 will then disconnect from the call. (Step 12).

The call screening feature of the present invention is implemented in a similar manner for calls involving cellular telephone users except that a call "charge type" identifier, described below, is also employed. It is known in the art to provide a "Calling Party Pays" CPP) service whereby a calling party can pay for all transport and access cellular charges associated with a call terminated to a cellular user. On a CPP call, in accordance with the present invention, the autobridge 80, upon answer by the called party 40 (Step 8), transmits a call charge type identifier to the called party 40, for example, in the form of a distinctive tone, indicating that the call is a CPP call. The autobridge 80 is informed by the appropriate CPP service provider (e.g., via SS7 signaling) of whether the calling party 20 is a subscriber to such a service and thus, knows whether to transmit the call charge type identifier to the called party 40. On a CPP call, although the called party 40 may incur an initial cellular charge for picking up and screening the call, any charge imposed after the parties are connected would be incurred by the calling party 20. Accordingly, the call charge type identifier provides cellular users with additional call screening information—in particular, whether the calling party is paying for the call—to further assist them in deciding whether to talk with the calling party.

Accordingly, the architecture and call flow of FIG. 2 provides call screening capabilities that have heretofore been unavailable except in limited ways: (i) using a conventional telephone answering machine and (ii) without any ability to provide call screening in conjunction with network-based services such as call waiting and cellular services.

The many features and advantages of the present invention are apparent from the detailed specification, and thus, it is intended by the appended claims to cover all such features and advantages of the invention which fall within the true spirit and scope of the present invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims. For example, although the features and advantages of the present invention are illustrated in a single switch environment (i.e., on a local or intra-LATA call), these same features and advantages are readily attainable in a multiple switch environment (i.e., on a long distance or inter-LATA call) or in a PBX environment by those of ordinary skill in the art given the present disclosure.

We claim:

1. A method of providing a called party at a called party station with the ability to screen calls, comprising the steps of:

determining whether the calling party will pay for cellular charges associated with a call to the called party station; and after the called party answers the call, transmitting a call charge type identifier to the called party station to indicate that the call is a calling party pays call.

2. A method of providing a called party at a called party station with the ability to screen calls, comprising the steps of:

after the called party answers a call, transmitting a call charge type identifier to the called party station to indicate that the call is a calling party pays call; and receiving an indication from the called party station that the called party will accept the calling party's call.

3. The method of claim 2, further comprising the step of:

imposing cellular charges associated with the call on the calling party.

4. A method of providing a called party with the ability to screen calls, comprising the steps of:

forwarding a call to the called party to a voice mailbox so that a calling party can leave a message for the called party;

initiating a call to the called party;

after the called party answers the call, transmitting a call charge type identifier to the called party to indicate that a telephone connection between the calling party and the called party is a calling party pays call; and bridging the call forwarded to the voice mailbox and the call to the called party so that the called party can hear the calling party leaving a message for the called party.

5. The method of claim 4, wherein the step of transmitting a call charge type identifier to the called party includes the step of transmitting a distinctive tone to the called party.

6. The method of claim 4 further comprising the step of muting called party voice signals.

7. The method of claim 4, further comprising the steps of:

receiving a request from the called party station for a telephone connection between the calling party and the called party; and completing a telephone connection between the calling party and the called party.

* * * * *